United States Patent
Farooqui et al.

(10) Patent No.: US 6,243,728 B1
(45) Date of Patent: Jun. 5, 2001

(54) PARTITIONED SHIFT RIGHT LOGIC CIRCUIT HAVING ROUNDING SUPPORT

(75) Inventors: Aamir Alam Farooqui, Sunnyvale; Vojin G. Oklobdzija, Berkeley; Farzad Chehrazi, San Jose; Wei-Jen Li, Fremont; Andy W. Yu, Saratoga, all of CA (US)

(73) Assignees: Sony Corporation of Japan, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/351,273

(22) Filed: Jul. 12, 1999

(51) Int. Cl.[7] .................................................. G06F 5/01
(52) U.S. Cl. ................................... 708/209; 708/551
(58) Field of Search .................... 708/209, 551, 708/497

(56) References Cited

U.S. PATENT DOCUMENTS

| | | | |
|---|---|---|---|
| 5,329,475 | * | 7/1994 | Juri et al. .............................. 708/551 |
| 5,424,967 | * | 6/1995 | Lee ....................................... 708/209 |
| 5,696,710 | * | 12/1997 | Hague et al. .......................... 708/551 |
| 5,771,185 | * | 6/1998 | Makineni ............................. 708/209 |
| 6,006,244 | * | 12/1999 | Mahurin ............................... 708/209 |
| 6,035,310 | * | 3/2000 | Mahurin ............................... 708/209 |
| 6,098,087 | * | 8/2000 | Lemay ................................. 708/209 |
| 6,148,317 | * | 11/2000 | Riddle et al. ......................... 708/551 |

OTHER PUBLICATIONS

A. Farooqui et al.; "Multiplexer Based Adder for Media Signal Processing"; LSI System Laboratory, SONY US Research Laboratories, San Jose, CA; Integration Corp., Berkeley, CA.

A. Farooqui et al.; "VLSI Implementation of Early Branch Prediction Circuits for High Performance Computing"; Dept. of Electrical and Computer Eng., University of CA, Davis, CA; Integration Berkeley, CA; 1999 IEEE.

* cited by examiner

*Primary Examiner*—David H. Malzahn
(74) *Attorney, Agent, or Firm*—Wagner, Murabito & Hao LLP

(57) ABSTRACT

A partitioned shift right logic circuit that is programmable and contains rounding support. The circuit of the present invention accepts a 32-bit value and a shift amount and then performs a right shift operation on the 32-bits and automatically rounds the result(s). Signed or unsigned values can be accepted. The right shift circuit is partitioned so that the 32-bit value can represent: (1) a single 32-bit number; or (2) two 16-bit values. A 1 bit selection input indicates the particular partition format. In operation, if the input value is not negative, then one ("1") is added at the guard bit position and a right shift with truncate is performed. If the input is negative and the guard bit is zero, then no addition is done and a right shift with truncate is performed. If the input is negative and the guard bit is one and the sticky bit is zero, then no addition is done and a right shift with truncate is performed. If the input is negative and the guard bit is one and the sticky bit is one, then one is added at the guard bit position and a right shift with truncate is performed. The shift circuitry used by the present invention is fully partitioned to accept word or half-word input and contains multiple cascaded multiplexer stages for performing partitioned right shifting and supports signed shifting. Each multiplexer stage can be programmed to perform a selected shift amount (including 0 shift). The right shift circuit of the present invention can be used in multi-media applications and can also be used for general purpose and VLIW (very long instruction word) processor without performance degradation.

20 Claims, 17 Drawing Sheets

1) POSITIVE NUMBER:

| $1 | $2 | REAL VALUE |
|---|---|---|
| 0000,0000,0000,0001 | 0000,0000,0000,0000 | 0.125 |
| 0000,0000,0000,0100(half) | 0000,0000,0000,0001 | 0.5 |
| 0000,0000,0000,0101 | 0000,0000,0000,0001 | 0.625 |
| 0000,0000,0000,0111 | 0000,0000,0000,0001 | 0.875 |

↑ GUARD BIT

2) NEGATIVE NUMBER:

| $1 (src) | $2 (dst) | REAL VALUE |
|---|---|---|
| 1111,1111,1111,1111, | 0000,0000,0000,0000 | -0.125 |
| 1111,1111,1111,1110 | 0000,0000,0000,0000 | -0.25 |
| 1111,1111,1111,1101 | 0000,0000,0000,0000 | -0.375 |
| 1111,1111,1111,1100(half) | 1111,1111,1111,1111 | -0.5 |
| 1111,1111,1111,1011 | 1111,1111,1111,1111 | -0.625 |
| 1111,1111,1111,1010 | 1111,1111,1111,1111 | -0.75 |
| 1111,1111,1111,1001 | 1111,1111,1111,1111 | -0.875 |
| 1111,1111,1111,1000 | 1111,1111,1111,1111 | -1 |

↑ 12
GUARD BIT

FIGURE 1B

PARTITIONED SHIFT RIGHT LOGIC CIRCUIT HAVING ROUNDING SUPPORT

BACKGROUND OF THE INVENTION

1. Field of the Invention

The present invention relates to the field of hardware used for implementing arithmetic operations such as processor instructions. More specifically, the present invention relates to a binary shift right circuit for signed and non-signed binary values.

2. Related Art

Binary right shift circuits input multi-bit binary values and shift the bits to the right by a predetermined number of bits. By right shifting, the binary value is typically divided. For instance, a right shift by one bit position divides the original number by two. A right shift by three bit positions divides the original number by eight, etc. Generally, a right shift by n bit positions will divide the original number by $2^n$. Right shift circuits of the prior art ignore the bits that are shifted out of the original binary value (e.g., truncates the result) and zeros are typically shifted into the right side, which is also called the most significant bit (MSB) position. Many arithmetic functions utilize the right shift operation and, in practice, arithmetic logic units (ALUs) of hardware processors always contain one or more right shift hardware units. One such arithmetic operation that utilizes the right shift operation is used in conjunction with processing Motion Picture Expert Group (MPEG) digital data.

The basic steps in MPEG compression and decompression processes are based around computationally demanding functions such as the Inverse Discrete Cosine Transform (IDCT) function, the Discrete Cosine Transform (DCT), Quantization and Motion Compensation functions. All of these functions require operations that shift, average, and/or divide multiple operands. For instance, a software MPEG decoder performs the IDCT function and Motion Compensation processes. More specifically, the IDCT function transforms the MPEG encoded coefficients back to their pixel values. In some decoders, an integer processor is preferred for performing IDCT and Motion Compensation functions because it is faster than a floating point processor.

However, the use of integer processors in the MPEG decoder requires conversion of the floating point values into binary integer values. Specifically, in one operation, a 12-bit range coefficient is input (integer) but the pixel values generated by the decoder are in the 9-bit range. Computations are performed using 16-bit operations to avoid any overflow problems. In this particular MPEG decoding process, a prescaling step is performed where the input value is left shifted by 3 bits to preserve precision in the 16-bit operations that follow the prescaling step. In the end, the result is then right shifted to accommodate the 9-bit output and to compensate for the prescaling operation.

Unfortunately, the right shift circuits of the prior art truncate their results, e.g., discarding the bits that are shifted out of the LSB (least significant bit) positions. This is disadvantageous because one of the main objectives of MPEG processing is to retain a high image quality. Another attribute of MPEG processing is that fast computations need to be performed because the MPEG data is typically large and transmitted isochronously. Therefore, computational latencies can produce unwanted artifacts (e.g., image jitter, etc.) in the audio/visual playback. In order to maintain high data precision and image quality, it would be advantageous to provide a right shift circuit that does not discard these truncated bits, yet does not require additional latencies in the computation. The present invention provides these advantages.

SUMMARY OF THE INVENTION

Accordingly, the present invention provides a right shift circuit that performs both right shifting and a rounding function, within a single instruction, thereby providing additional accuracy for the right shifted result. The rounding functionality is performed within the right shift instruction and therefore the present invention does not require execution of additional rounding instructions by the processor in order to achieve the same accuracy. The present invention preserves high image quality without sacrificing the speed of operation and is particularly advantageous for MPEG decoding although the circuit of the present invention can be applied to any number of uses.

A partitioned shift right circuit is described herein that is programmable and contains selective rounding support. The circuit of the present invention accepts a 32-bit input binary value and a binary shift amount vector and then performs a right shift operation on the 32-bits and automatically rounds the result(s). Signed or unsigned values can be accepted with or without sign extension. The right shift circuit is partitioned so that the 32-bit value can represent: (1) a single 32-bit number; or (2) two 16-bit values. A two bit selection input indicates the particular partition format. In a preferred embodiment, only two partition modes are available, a full 32-bit mode and a second mode supporting two 16-bit input values. In this configuration one signal, f0, selects the appropriate mode.

In operation, if the input value is not negative, then one ("1") is added at the guard bit position and a right shift with truncate is performed. However, if the input is negative and the guard bit is zero, then no addition is done and a right shift with truncate is performed. If the input is negative and the guard bit is one and the sticky bit is zero, then no addition is done and a right shift with truncate is performed. Lastly, if the input is negative and the guard bit is one and the sticky bit is one, then one is added at the guard bit position and a right shift with truncate is performed. The right shift circuitry used by the present invention is fully partitioned to accept word or half-word input and contains multiple cascaded multiplexer stages for performing partitioned right shifting and supports signed shifting with or without extension. Each multiplexer stage can be programmed to perform a selected right shift amount (including 0 shift). The right shift circuit of the present invention can be used in multimedia applications and can also be used for general purpose and VLIW (very long instruction word) processor without performance degradation.

More specifically, an embodiment of the present invention includes a circuit having a decoder receiving a shift value, indicating a number of bits to right shift an input binary value, and producing a decoded result indicating a guard bit position; a plurality of rounding control circuits together producing a multi-bit mask, each circuit receiving a respective bit of the decoded result and also receiving a respective predetermined number of bits of the input binary value, each of the rounding control circuits separately computing a respective sticky bit corresponding to its bit position and also computing a mask bit based on the respective sticky bit, a sign bit and the respective bit of the decoded result; an adder circuit adding the multi-bit mask to the input binary value to produce a sum value; and a right shift circuit producing a binary shifted result by right shifting the sum value a number of bits corresponding to the shift value.

Embodiments of the present invention include the above and wherein the right shift circuit comprises a plurality of cascaded multiplexer stages wherein each multiplexer stage is programmable to select a right shift amount from a predetermined range of values. Embodiments of the present invention include the above and wherein, for an ith rounding control circuit, the predetermined number of bits of the input binary value are the (i-1)th, (i-2)th, (i-3)th and (i-4)th bits of the input binary value and wherein the ith rounding control circuit comprises: OR logic producing a logical OR result of the (i-1)th, (i-2)th, (i-3)th and (i-4)th bits; output circuitry producing logical one in the mask provided the sign bit indicates a non-signed input binary value and its respective bit of the decoded result is a logical one; and wherein the output circuitry also produces a logical one in the mask provided the sign bit indicates a signed input binary value, the OR result is a logical one and its respective bit of the decoded result is a logical one.

BRIEF DESCRIPTION OF THE DRAWINGS

FIG. 1A is a table illustrating the results of four right shift operations having rounding support for positive numbers in non-signed format.

FIG. 1B is a table illustrating the results of eight right shift operations having rounding support for negative numbers in signed 2's complement format.

DETAILED DESCRIPTION OF THE INVENTION

Figure 2:
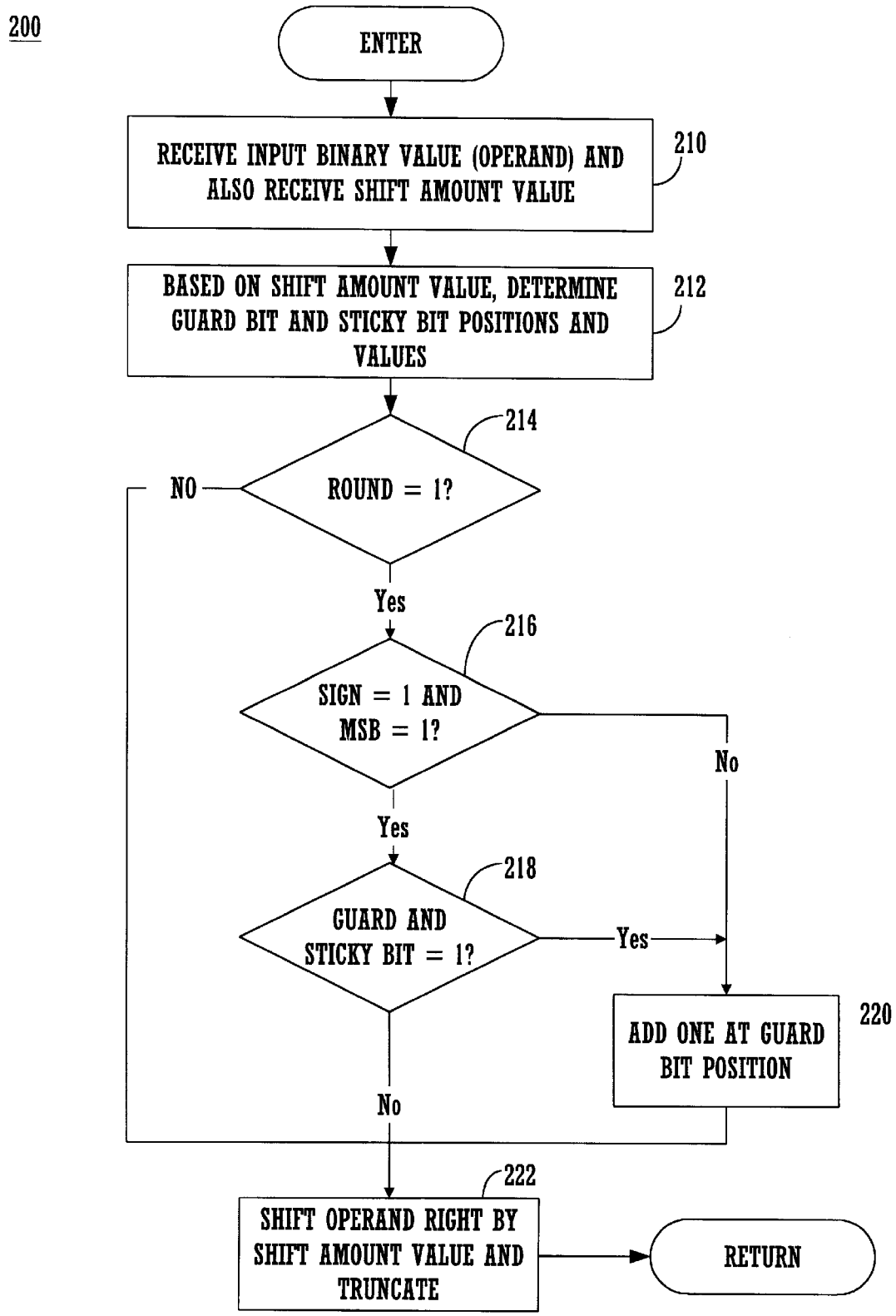
FIG. 2 is a flow diagram illustrating steps performed by the shift right logic circuit with rounding support (SRR circuit) in accordance with the present invention.

In the following detailed description of the present invention, a partitioned shift right logic circuit that is programmable and contains rounding support, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

The present invention provides a circuit for performing a right shift operation on an input binary value (operand) with rounding support all in one instruction. The circuit supports shift right operations on signed and unsigned values, word and half-word operands, single instruction multiple data (SIMD) operations, and can be programmed to selectively apply rounding support or not. The circuit contains a configurable shifter that can support different word sizes (e.g., word and half-word sizes), support signed or unsigned values, and can also operate in different modes (e.g., round to nearest half-value round, always round from zero, truncation, logical or arithmetic shift right). These configuration modes can be applied using a small number of control signals named partition, sign and round. Although the circuit of the present invention can be used for multi-media applications, it can also be used for general purpose and VLIW (very large instruction word) processors without performance degradation.

FIG. 1A illustrates a table 10 depicting exemplary positive decimal operands (represented in binary) that are applied to the right shift with round circuit of the present invention. Column 14 includes four exemplary binary input operands that are stored in register "$1." Register "$2" indicates the right shifted with round result as determined by one embodiment of the present invention for a right shift of 3 bit positions. This instruction can be represented by the following format:

shr.hw.a.rafz $2, $3, 3 where "shr.hw.a.rafz" is the shift right with round instruction syntax, "$2" and "$1" indicate the output and input registers, respectively, and "3" indicates the shift right amount or "vector."

FIG. 1A also illustrates the guard bit position for positive numbers in accordance with the present invention. The guard bit 12 is set according to the shift right value, e.g., 3 in this case. The guard bit position for positive numbers is always the $n^{th}$ bit (measured from the least significant bit) for a shift right amount of n bit positions. The first operand "0000,0000,0000,0001" of table 10 is 1 in decimal and shifting right by three bit positions divides this by 8. The guard bit is "0." Column 18 illustrates the real result of the divide operation, "0.125," which is rounded to zero as shown by the output entry of column 16. The second operand "0000,0000,0000,0100" is 4 in decimal and shifting right by three divides this by 8. The guard bit is "1." Column 18 illustrates the real result of the divide operation, "0.5," which is rounded to 1 as shown by the output entry of column 16. The last operand "0000,0000,0000,0111" is 7 in decimal and shifting right by three divides this by 8. The guard bit is "1." Column 18 illustrates the real result of the divide operation, "0.875," which is rounded to 1 as shown by the output entry of column 16.

According to the present invention, for positive numbers, if the guard bit is "1," then a logical "1" is added to the guard bit position of the input binary value and the result is then right shifted by the right shift value and truncated. This result is then stored in the output register. If the guard bit is "0," then an addition of "1" can be performed at the guard bit position, or an addition of "0" can be performed at the guard bit position, or no addition can be performed, and, either way, a right shift with truncate is then performed—all leading to the same result.

FIG. 1B illustrates a table 20 depicting exemplary signed negative operands that are applied to the right shift with round circuit of the present invention. Column 24 includes eight exemplary binary input operands that are stored in register "$1." Register "$2" indicates the right shifted with round result as determined by one embodiment of the present invention for a right shift of 3 bits. The same instruction syntax can be used as described with respect to table 10 of FIG. 1A. In this example, two's complement signed format is used.

FIG. 1B also illustrates the guard bit position for signed numbers in accordance with the present invention. The guard bit 12 is set according to the shift right value, e.g., 3 in this case. The guard bit position for signed format numbers is always the $n^{th}$ bit (measured from the least significant bit) for a shift right amount of n. Sticky bits are also relevant for signed numbers. The sticky bit is defined as the OR function of all bits positioned to the right, e.g., toward the LSB, of the guard bit. The first operand "1111, 1111,1111,1111" of table 20 is −1 in decimal and shifting right by three divides this by 8. The guard bit is "1" and the sticky bit is "1." Column 28 illustrates the real result of the divide operation, "−0.125," which is rounded to zero as shown by the output entry of column 26. The third operand "1111,1111,1111,1101" of table 20 is −3 in decimal and shifting right by three divides this by 8. The guard bit is "1" and the sticky bit is "0." Column 28 illustrates the real result of the divide operation, "−0.375," which is rounded to zero as shown by the output entry of column 26.

The fourth operand "1111,1111,1111,1100" of table 20 of FIG. 1B is the half point or −4 in decimal and shifting right by three divides this by 8. The guard bit is "1" but the sticky bit is "0." Column 28 illustrates the real result of the divide operation, "−0.5," which is rounded to −1 as shown by the output entry of column 26. The last operand "1111,1111, 1111,1000" of table 20 is −8 in decimal and shifting right by three divides this by 8. The guard bit is "0" and the sticky bit is "1." Column 28 illustrates the real result of the divide operation, "−1," which is rounded to −1 as shown by the output entry of column 26.

According to the present invention, for signed negative numbers, if the guard bit is "0," then no addition is performed and only a right shift with truncate is performed. If the guard bit is "1" and the sticky bit is "0," then no addition is performed and only a right shift with truncate is performed. Lastly, if the guard bit is "1" and the sticky bit is "1," then a logical "1" is added to the guard bit position of the input binary value and the result is then right shifted by the right shift value and truncated. This result is then stored in the output register.

FIG. 2 illustrates a flow diagram 200 of the steps performed by the right shift with round circuit of the present invention. These steps 200 are performed in association with a single instruction. The shifter circuit of the present invention performs the rounding function of the right-shifted result. In "round to nearest, half-value round away from zero" operation, a "1" is added at the guard bit position and then the input is truncated by removing the bits to the right of the LSB. In order to check the half-value, all bits to the right of the guard bit are ORed to get the single "sticky" bit. In addition and/or subtraction operations, the guard bit and sticky bit positions are fixed, but in shift right operations, these bit positions vary with the shift amount. Depending on the shift amount, the guard bit can be at the bit position zero, or at the maximum shift position, or any other position in between. This is one difficulty in providing rounding operations with a shift right circuit. The present invention provides the following steps to solve this problem to perform shift right with the "round to nearest, half-value round away from zero" operation.

According to process 200 of FIG. 2, an input binary value (operand) is received and a shift amount value (vector) is also received at step 210. The input operand can be received in a register. At step 212, the present invention uses the shift amount value to determine the guard bit position and also to determine the sticky bit value. For a right shift amount of n bits, the guard bit is the $n^{th}$ bit of the input operand as measured from the LSB. In one embodiment of the present invention, the sticky bit is determined by performing an OR operation on all bits of the input operand that lie to the right of the guard bit position. In a preferred embodiment, the present invention only performs the OR operation on a predetermined number of bits (e.g., 4) that lie to the right of the guard bit position in order to compute the sticky bit value. This embodiment reduces the circuitry required to compute the sticky bit value while providing adequate accuracy in most instances. In the preferred embodiment, separate circuits are used to simultaneously compute sticky bit values for each possible guard bit position, with only one of these values being pertinent depending on the shift amount value.

At step 214, the present invention checks if the "round" input is asserted. The round input determines whether or not rounding is required. If rounding is not required, then step 222 is entered next where the input operand is shifted to the right by the shift amount value and truncated. In this case, no value (or "0") is added to the input operand. If rounding is required (round=1), then step 216 is entered. At step 216, the present invention checks if the "sign" input is asserted and if the most significant bit (MSB) of the input operand is a logical "1." If these are true, then step 218 is entered because the input operand is negative. If both of these conditions are not met, then the input operand is positive and step 220 is entered. At step 220, a logical "1" is added to the input operand at the guard bit position and then step 222 is entered to perform the right shift operation. At the completion of step 222, the result is placed into the output register.

At step 218 of FIG. 2, the input operand has been determined to be negative. Therefore, a check is made to determine if the guard bit is "1" and also if the sticky bit is "1." If so, then step 220 is entered and a logical "1" is added to the input operand at the guard bit position and then step 222 is entered to perform the right shift operation. At step 218, if the sticky bit is not "1" or the guard bit is not "1," then step 222 is entered without adding the "1" to the guard bit position. It is appreciated that if the input operand is positive, then step 220 is entered regardless of the sticky bit or guard bit values. Based on process 200, four steps are required to perform the shift right with "round to nearest, half-value round away from zero" operation. These steps are: 1) decode the shift amount value; 2) determine the rounding coefficient, also called the "mask"; 3) add the rounding coefficient at the guard bit position; and 4) shift right.

Figure 3:
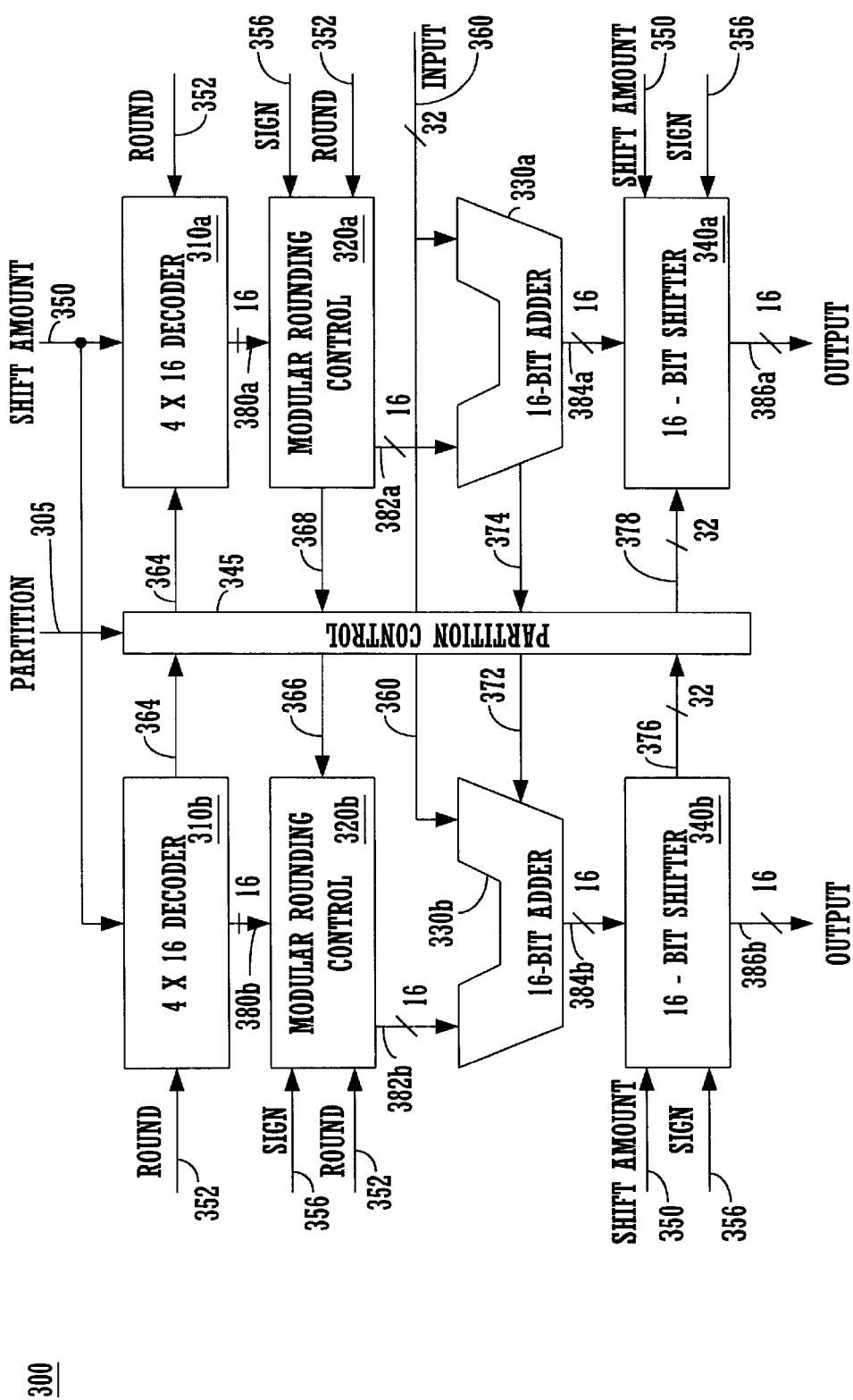
FIG. 3 is a logical block diagram of the partitioned shift right logic circuit with rounding support (SRR circuit) in accordance with one embodiment of the present invention.

FIG. 3 illustrates a block diagram of the shift right with round (SRR) circuit 300 in accordance with one embodiment of the present invention. The SRR circuit 300 is exemplary and is a 32-bit partitioned shifter. The inputs are a 5-bit shift amount vector 350, a rounding control signal ("round") 352, a sign signal 356, a partition control signal ("partition") 305 and an input binary value on bus 360. The output of the SRR circuit 300 is a 32-bit result 386a–386b. The shift amount vector 350 specifies the shift right amount, e.g., if this vector is "00011," then the operation to be performed is shifting the input operand by three bit positions. Shift mode (arithmetic or logical) is specified by the sign bit 356 which indicates if the input operand 360 is in signed format or not. If this bit is "1," then the most significant bits of the shifted result are replaced by the extended sign bits, otherwise they are replaced by zero. If this bit is "0," then the input operand is in un-signed format. The round control signal 352 is used to control the mode of rounding. If this bit is set to "1," then rounding is performed, otherwise truncation is performed.

Generally, the partitioning of the SRR circuit 300 is controlled by the partition control block 345 and the partition control signal 305. If the partition control bit is set to "1," then a 32-bit single value is expected and the least significant bits of the 16-bit shifter 340b are input to the 16-bit shifter 340a as the most significant bits. Otherwise, two 16-bit values are expected and zeros are shifted into shifter 340a. The SRR circuit 300 contains four main segments, the shift amount decoder 310a–310b, the modular rounding control circuits 320a–320b, the partitioned adder 330a–330b and the partitioned shifter 340a–340b.

Decoder. The shift amount decoder 310a–310b of FIG. 3 is a partitioned 5×32 decoder circuit composed, in one embodiment, of two 4×16 binary to decimal decoders with controls for rounding and partitioning. The input to the decoder is a 5-bit number called the shift amount vector on bus 350. The LSB 4-bits of the shift amount 350 are coupled to 4×16 decoder 310a. Assuming rounding is requested (round=1), based on the partition control signal 305, the decoder 310a–310b generates two 16-bit numbers 380a–380b or a single 32-bit number that consists of all 0's except a "1" exists at the bit position equal to the decimal value of the shift amount 350. This corresponds to the position of the guard bit. For example, if the input shift amount 350 is "00101" (decimal 5), and the partition bit 305 is "0," then the two 16-bit vectors 380b and 380a will have a "1" at the fifth bit position from the LSB and "0" elsewhere as shown below:

380b = 0000 0000 0001 0000    380a = 0000 0000 0001 0000

If the input shift amount 350 is "00101" (decimal 5), and the partition bit 305 is "1," then the two 16-bit vectors 380b and 380a will have the following values:

380b = 0000 0000 0000 0000    380a = 0000 0000 0001 0000

It is appreciated that if the round control bit 352 is "0," then the output vector 380a–380b of the decoder 310a–310b is all "0," meaning that the rounding coefficient is zero. The output 380a–380b of the decoder 310a–310b is called a decoded output or a decoded "vector." It is appreciated that the 32-bit decoded vector 380a–380b controls the rounding control unit 320a–320b.

Figure 4:
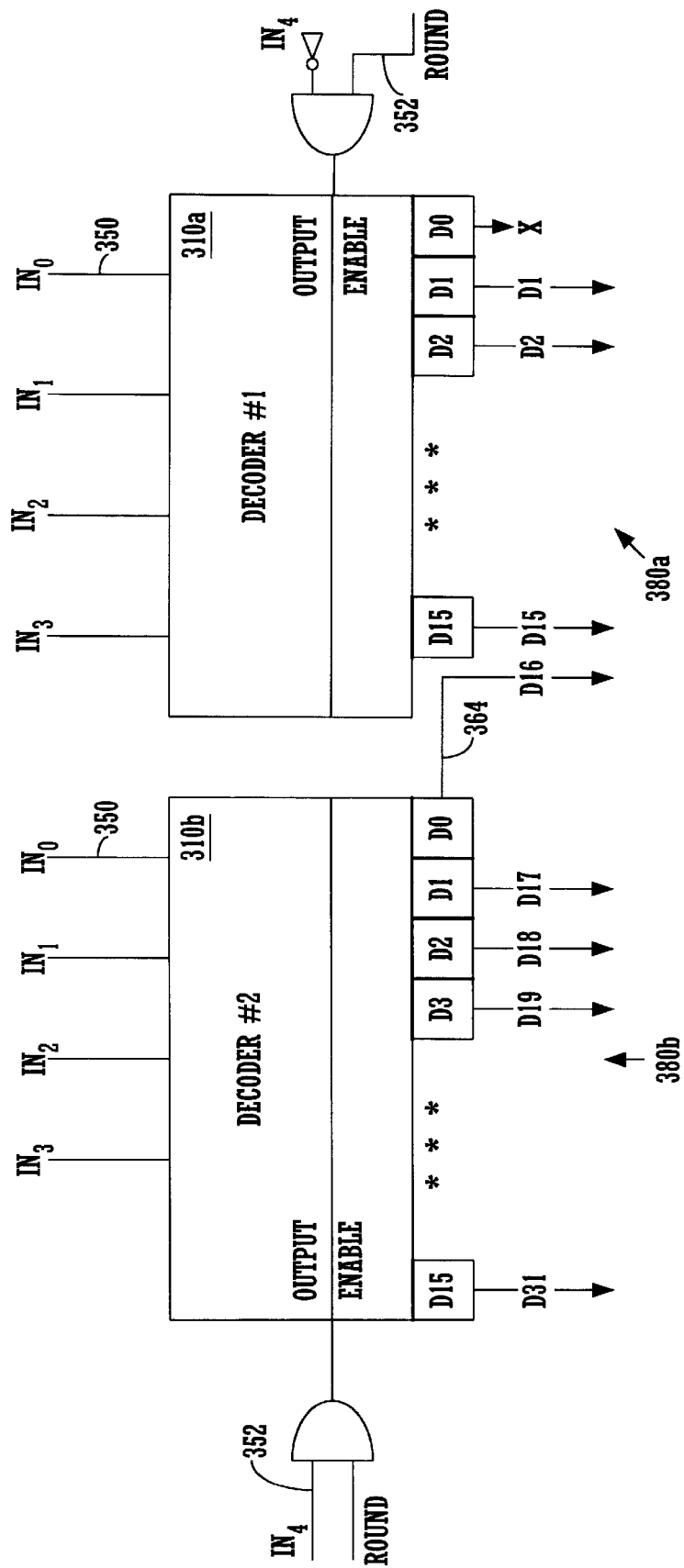
FIG. 4 is a block diagram of a configuration of decoder outputs for a partitioning configuration that supports a single 32-bit value in accordance with one embodiment of the present invention.

FIG. 3 and FIG. 4 illustrate line 364 that can be selectively passed from 4×16 decoder 310b to 4×16 decoder 310a via partition control circuit 345. As shown in FIG. 4, because a shift amount of "0" is not allowed, the LSB output "D0" of 4×16 decoder 310a is not used, e.g., fed to "X." Because this 4×16 decoder circuit 310a is duplicated and used as 4×16 decoder 310b, in one embodiment, the output "D0" of decoder 310b is fed, over line 364, to act as the 16th bit ("D16") of decoder 310a for 32-bit operations. For instance, decoded output 380a therefore contains bits D1–D16 which are made from D1–D15 of decoder 310a and D0 of decoder 310b as shown in FIG. 4. Also, decoded output 380b contains bits D17–D31 with D17 being bit D1 of 4×16 decoder 310b. The above configuration is used when the partition control bit 305 is "1" thereby indicating a single 32 bit input binary value. However, when the partition control bit 305 is "0," line 364 is blocked by partition control circuit 345 and output 380a contains bits D1–D15 of 4×16 decoder 310a and output 380b contains bits D1–D15 of 4×16 decoder 310b (bit D0 of decoder 310b is not used).

During 32-bit operation, the output of decoder1 310a is disabled using the most significant bit input bit (In4) of the shift amount 350. Similarly, the rounding control bit 352 ("Round") is used to disble the outputs of both the decoders 310a–310b in case of non-rounding operation, using the circuiry as shown in FIG. 4.

Modular Rounding Control Units.

As shown in FIG. 3, the decoded vector 380a–380b is used to control the modular rounding control circuits 320a–320b. It is appreciated that rounding control circuits 320a–320b also receive the input binary number 360, the sign bit 356 and the round bit 352. For partitioning, modular rounding circuit 320a outputs signal 368 to partitioning control circuit 345 which generates signal 366 to modular rounding circuit 320b. Modular rounding control circuits 320a and 320b generate outputs 382a and 382b, respectively, which together form a mask (or rounding coefficient) which is added to the input binary number of bus 360 by partitioned adder circuits 330a–330b.

Figure 5:
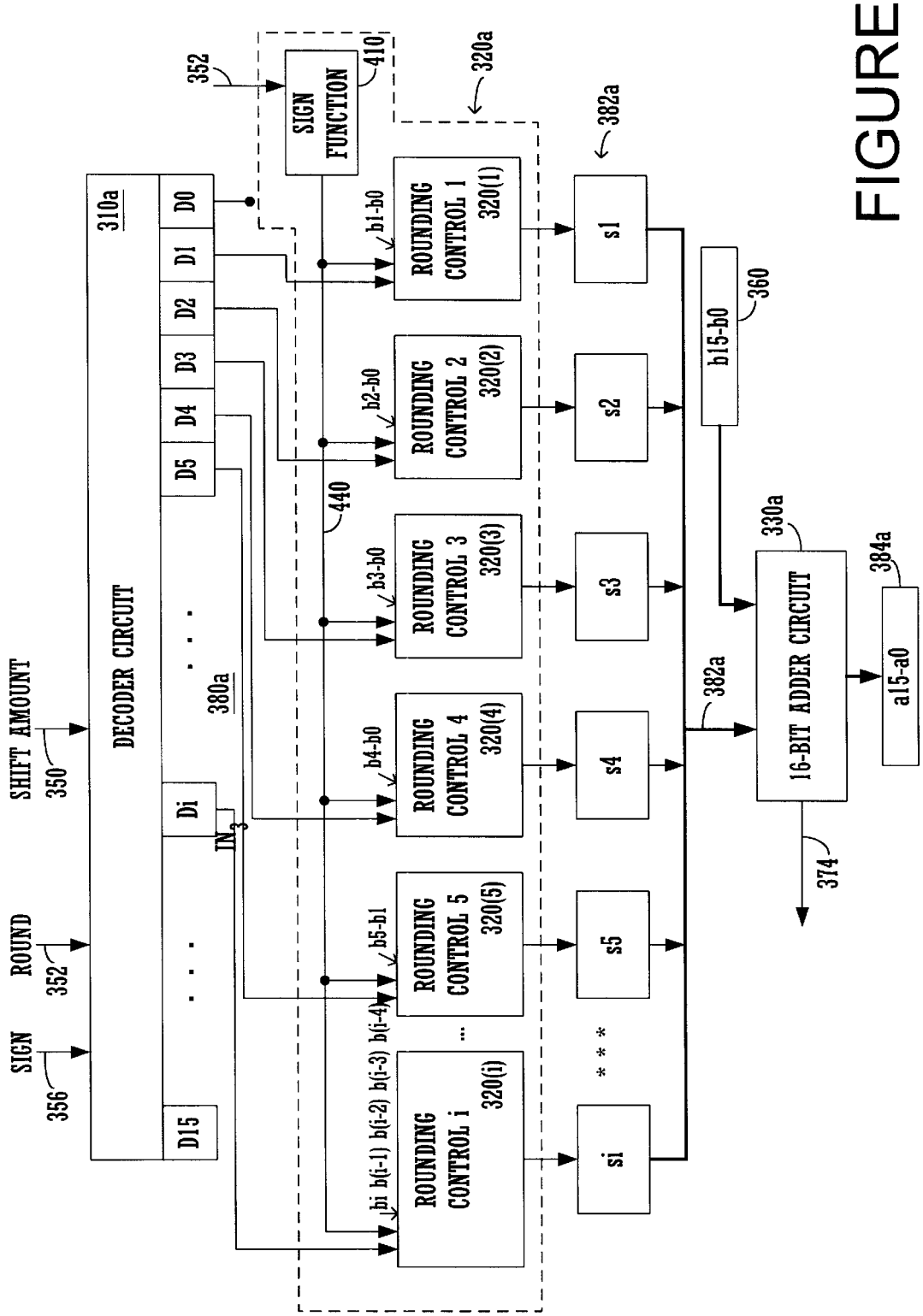
FIG. 5 is a block diagram of a portion of the partitioned shift right logic circuit with rounding support in accordance with the present invention and specifically illustrates the interface between the decoder circuit and the rounding control units.

FIG. 5 illustrates the circuitry of the modular control circuit 320a in more detail and illustrates the interface between modular control circuit 320a, the 4×16 decoder circuit 310a and the partitioned 16-bit adder 330a. It is appreciated that the details and interface concerning modular control circuit 320b, the 4×16 decoder circuit 310b and the partitioned 16-bit adder 330b are similarly configured. Regarding FIG. 5, rounding control circuit 320a contains a separate rounding control unit 320(1)–320(i) for each of the 15 bits of the decoder circuit 310a. In other words, modular control circuit 320a contains 16 identical units, one separate circuit for each possible guard bit position. Each cell calculates the rounding coefficient for each bit based on factors such as the rounding mode and the sticky and guard bit position. Using this architecture, the present invention provides a separate circuit to determine the sticky bit for each bit position. These circuits all operate in parallel.

Each of the modular rounding control units 320(1)–320(i) receives its respective bit of the decoded result 380a and also receives the four bits of the input binary value (of bus 360) that lie to the right of the guard bit. For instance, output D1 of circuit 310a is coupled to rounding control unit 320(1), output D2 of circuit 310a is coupled to rounding control unit 320(2), . . . , and output Di of circuit 310a is coupled to rounding control unit 320(i). Rounding control units 320(1) –320(i) contain logic for simultaneously computing sticky bits for each bit position and this information is used to generate the rounding coefficient 382a which is composed of bits s1–si. The first of the rounding control units receive less than four bits of the input operand. For instance, in the case of i=0, all the bits to left of the guard bit are zero and similarly for i=1, b(i-1) is the input bit zero and bits b(i-2), b(i-3) and b(i-4) are zero, etc.

In one embodiment of the present invention, the computation of the sticky bits is limited to a predetermined number of bits to the right of the guard bit to reduce circuit complexity in the SRR circuit 300. In one implementation, this predetermined amount is 4 bits which provides full precision for rounding operations as required by the MPEG standard for quantization and motion compensation. Further, by reducing the number of bits involved in the sticky bit computation, the amount of circuit complexity is significantly reduced both in the use of driver circuits and wiring resources and congestion.

The modular rounding circuit 320a therefore contains a separate modular rounding unit 320(i) for computing the sticky bit for each possible bit position, i, of the input binary value of bus 360. This is done because it is not known, a priori, what the shift amount 350 will be. These sticky bit computations are all performed in parallel. Bits 0 and 1 of the input binary vector 360 (b0 and b1) are input to modular rounding control unit 320(1), with bit 0 used in the computation of the sticky bit. Bits 0–2 of the input binary vector 360 (b0–b2) are input to modular rounding control unit 320(2), with bits 0–1 used in the computation of the sticky bit. Bits 0–3 of the input binary vector 360 (b0–b3) are input to modular rounding control unit 320(3), with bits 0–2 used in the computation of the sticky bit. Bits 0–4 of the input binary vector 360 (b0–b4) are input to modular rounding control unit 320(4), with bits 0–3 used in the computation of the sticky bit. Bits 1–5 of the input binary vector 360 (b1–b5) are input to modular rounding control unit 320(5), with bits 1–4 used in the computation of the sticky bit. Generalizing, bits bi, b(i-1), b(i-2), b(i-3) and b(i-4) of the input binary vector 360 are input to modular rounding control unit 320(i), with bits b(i-1), b(i-2), b(i-3) and b(i-4) used in the computation of the associated sticky bit.

It is appreciated that a sign circuit 410 of FIG. 5 generates an output signal over line 440. This signal 440 is asserted high ("1") when the input binary value 360 is positive and the rounding control signal 352 is asserted. Signal 440 is supplied to each of the modular rounding control units 320(1)–320(i). Each of the modular rounding control units 320(1)-320(i) generates a respective bit of the rounding coefficient or "mask" shown as bits s1–si of output 382a. For instance, rounding control unit 320(1) generates bit s1 and rounding control unit 320(i) generates bit si of output 382a.

Figure 6:
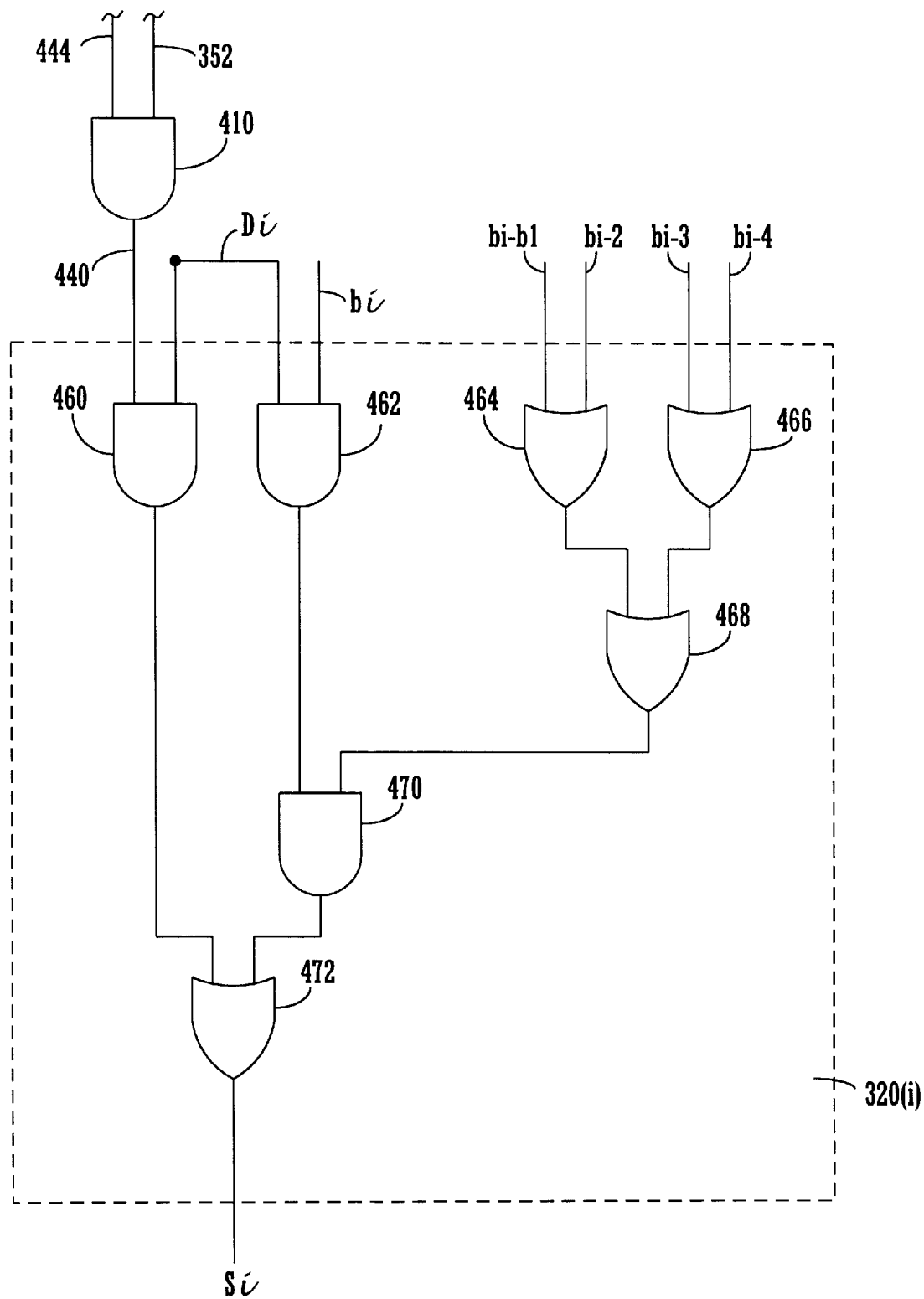
FIG. 6 is a schematic diagram of the logic contained within an exemplary rounding control unit in accordance with one embodiment of the present invention.

FIG. 6 illustrates the circuitry of modular rounding control unit 320(i) and also indicates the circuitry of the sign circuit 410. The circuitry for modular rounding control unit 320(i) is replicated for each other modular rounding control unit of units 320(1)–320(15). Line 440 is a control signal common to all modular rounding control units and is asserted high when the input binary value 360 is positive and the rounding control signal 352 (FIG. 5) is asserted high. Line 440 is generated by the output of AND gate 410 which receives, as a first input, the rounding control signal 352 and, as a second input, line 444. Line 444 is high when the input binary value 360 is positive. Line 440 and the respective bit, Di, of the decoder unit 310a are both input to AND gate 460. The output of AND gate 460 is input as one input to OR gate 472.

The respective bit, Di, of the decoder unit 310a and the ith bit, bi, of the input binary value of bus 360 are both input to AND gate 462. The output of AND gate 462 is input to AND gate 470. The output of AND gate 470 is input to the other input of OR gate 472. The remaining circuitry, OR gates 464, 466 and 468 perform the sticky bit computation for modular rounding control unit 320(i) for a guard bit position if i. The output of OR gate 468 is coupled to the other input of AND gate 470. If any of bits b(i-1), b(i-2), b(i-3) or b(i-4) are logical "1," then the output of OR gate 468 will be logical "1." The output of OR gate 472 is the ith bit (si) of the rounding coefficient 382a.

The output si will be a logical "1" provided (1) the input binary value is positive, rounding is required and the guard bit position of the input binary value is "1" or (2) the value of the input operand at the guard bit position is "1," the sticky bit is "1" and the value of the guard bit position is "1." Option (2) applies to negative numbers. The output si will be a logical "0" for all other cases. It is appreciated that all modular control units 320(1)–320(15) simultaneously compute their respective bits of output 382a. It is appreciated that depending on the rounding mode and sticky bit and guard bits, the output 382a–382b of the modular control units 320a–320b can either be all zeros or the same output as the decoder units 310a–310b.

Adder Circuit.

Bits s1–s15 of the mask 382a of FIG. 5 are added to bits b0–b15 of the input binary value 360 by 16-bit partitioned adder circuit 330a which generates bits a0–a15 of a sum output 384. This addition is performed so that the subsequent right shift will generate a rounded result, when required. It is appreciated that while a number of different adder circuits can be used in accordance with the present invention, one particular partitioned adder design that can be used as adder 330a and adder 330b is described in co-pending U.S. patent application Ser. No. 09/275,068, entitled "A Multiplexer-based Parallel N-Bit Adder Circuit for High Speed Processing," by Aamin Farooqui, Vojin Oklobdzija and Farzad Chehrazi, filed on Mar. 23, 1999, and assigned to the assignee of the present invention which application is hereby incorporated by reference. The adder described in this co-pending application is a partitioned carry-propagate adder. Adder circuit 330a generates a carry out signal over line 374 which is supplied to partition control circuit 345 (FIG. 3).

Right Shifter.

Referring to FIG. 3, the sum output 384a–384b of adder 330a and adder 330b is then applied to the right shifter circuit which is partitioned into a 16-bit shifter 340b and a 16-bit shifter 340a. Shifters 340a–340b also receive the sign control signal 356 and the shift amount vector 350 and perform a right shift with truncate operation on signed or unsigned values. If rounding is required, then the appropriate addition operation is performed by adders 330a and 330b. Depending on the partitioning mode, shifter circuit 340b generates signals over bus 376 to partition control circuit 345 which can be applied to shifter circuit 340a via bus 378. The partition control bit 305 controls the partition of the shifters 340a–340b and the sign bit 356 is used to provide sign extension in case of negative numbers. It is appreciated that shifters 340a–340b are capable of shifting signed or unsigned formatted values. Regarding signed shifting modes, the right shifter 340a–340b can shift sign extended or not extended. If the partition control bit 305 is set to "1," then the least significant bits of the 16-bit shifter 340a are input to the 16-bit shifter 340a as MSB, otherwise they are blocked and zeros are input to shifter 340a. The outputs 386a–386b of the shifters 340a–340b are the output of SRR circuit 300 of the present invention.

Figure 7:
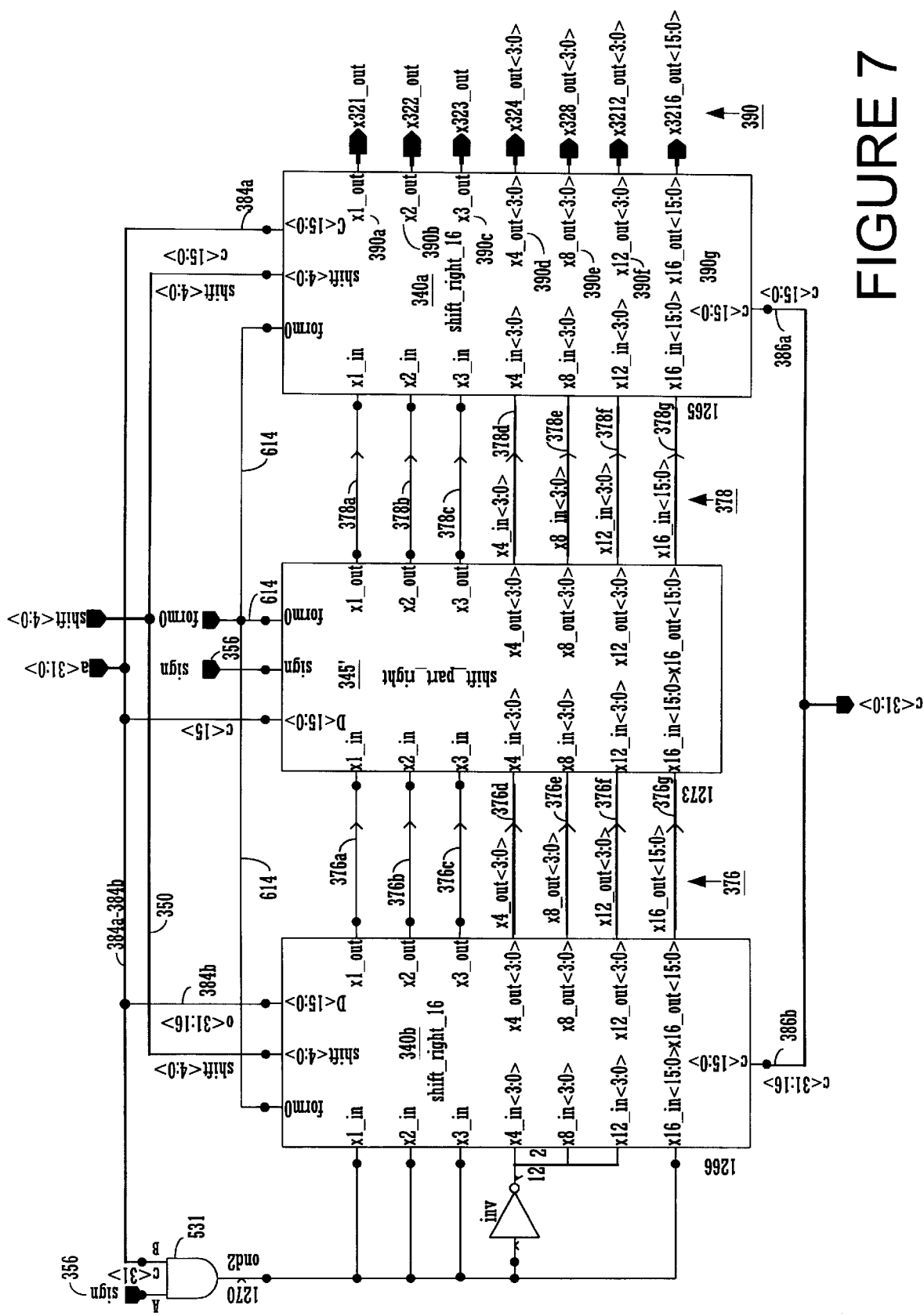
FIG. 7 is a schematic diagram of the partitioned shift right logic circuits and their associated partition control logic in accordance with one embodiment of the present invention.

FIG. 7 illustrates a circuit diagram of one implementation of shifters 340a–340b in accordance with the present invention. Shifters 340a–340b are coupled to the portion 345' of the partition control circuit relevant for their partitioning functions. Bus 384a–384b is a 32-bit bus and contains the output binary sum value from adders 330a–330b which are labeled as bits "a31 . . . a0." The 5-bit shift amount vector is received over bus 350 and the bits are labeled as "shift4 . . . shift0." The shift4 . . . shift0 bits are coupled to both shifters 340a and 340b. Bits a0 . . . a15 are coupled to 16-bit shifter 340a and bits a16 . . . a31 are coupled to 16-bit shifter 340b. The sign bit 356 is ANDed with the MSB a15 by AND gate 531 and the output is coupled to inputs (x1, x2, x3, x4, x8, x12 and x16) of shifter 340b as shown in FIG. 7. The sign bit 356 is also coupled to partition control circuit 345'. A format input, f0, on line 614, is also coupled to shifters 340a–340b and partition control circuit 345'. Format input f0 is a part of the partition control signal 305 (FIG. 3). This value indicates whether the shifters are performing a 32-bit shift or two 16-bit partitioned shift operations. The MSB a15 is also coupled to the shift partition circuit 345'.

Outputs (x1, x2, x3, x4, x8, x12 and x16) from shifter 340b are coupled to corresponding inputs of partition control circuit 345' via lines/buses 376a–376g, respectively. Buses 376d–376f are each 4-bits wide and bus 376g is 8-bits wide. Outputs (x1, x2, x3, x4, x8, x12 and x16) from partition control circuit 345' are coupled to corresponding inputs of shifter 340a via lines/buses 378a–378g, respectively. Buses 378d–378f are each 4-bits wide and bus 378g is 8-bits wide. Shifter 340a generates outputs (x1, x2, x3, x4, x8, x12 and x16) over lines/buses 390a–390g, respectively, that are not used in the embodiment shown in FIG. 7. It is appreciated that the outputs 386a–386b of shifters 340a–340b contain the output value of SRR circuit 300 of the present invention and are labeled as bits "c0 . . . c31" with output 386a containing bits c5 . . . c0 and output 386b containing bits c31 . . . c16.

Figure 8A:
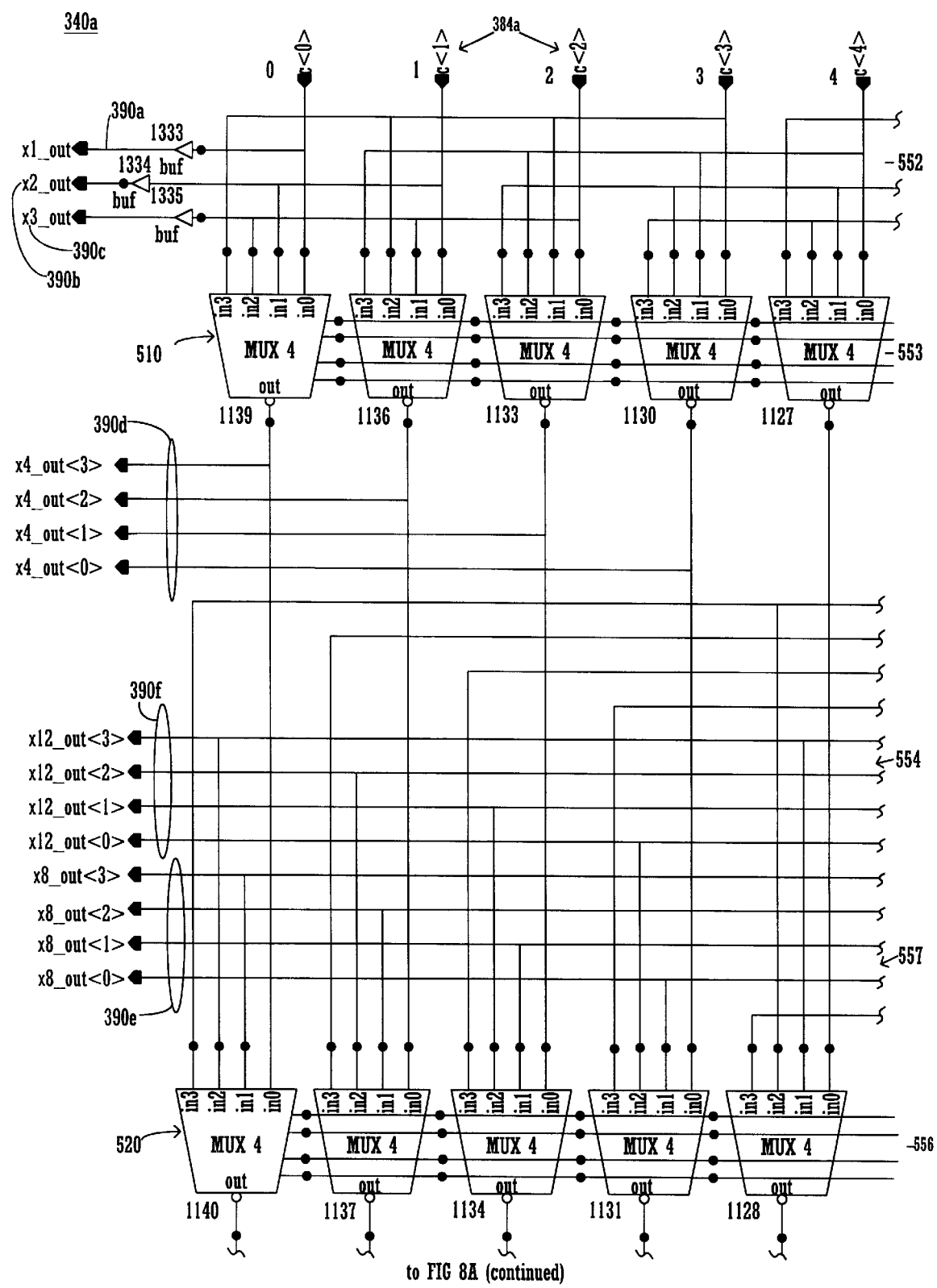
FIG. 8A, FIG. 8B and FIG. 8C represent a schematic diagram of one partitioned shift right logic circuit having cascaded multiplexer stages for right shifting in accordance with one embodiment of the present invention.
Figure 8A:
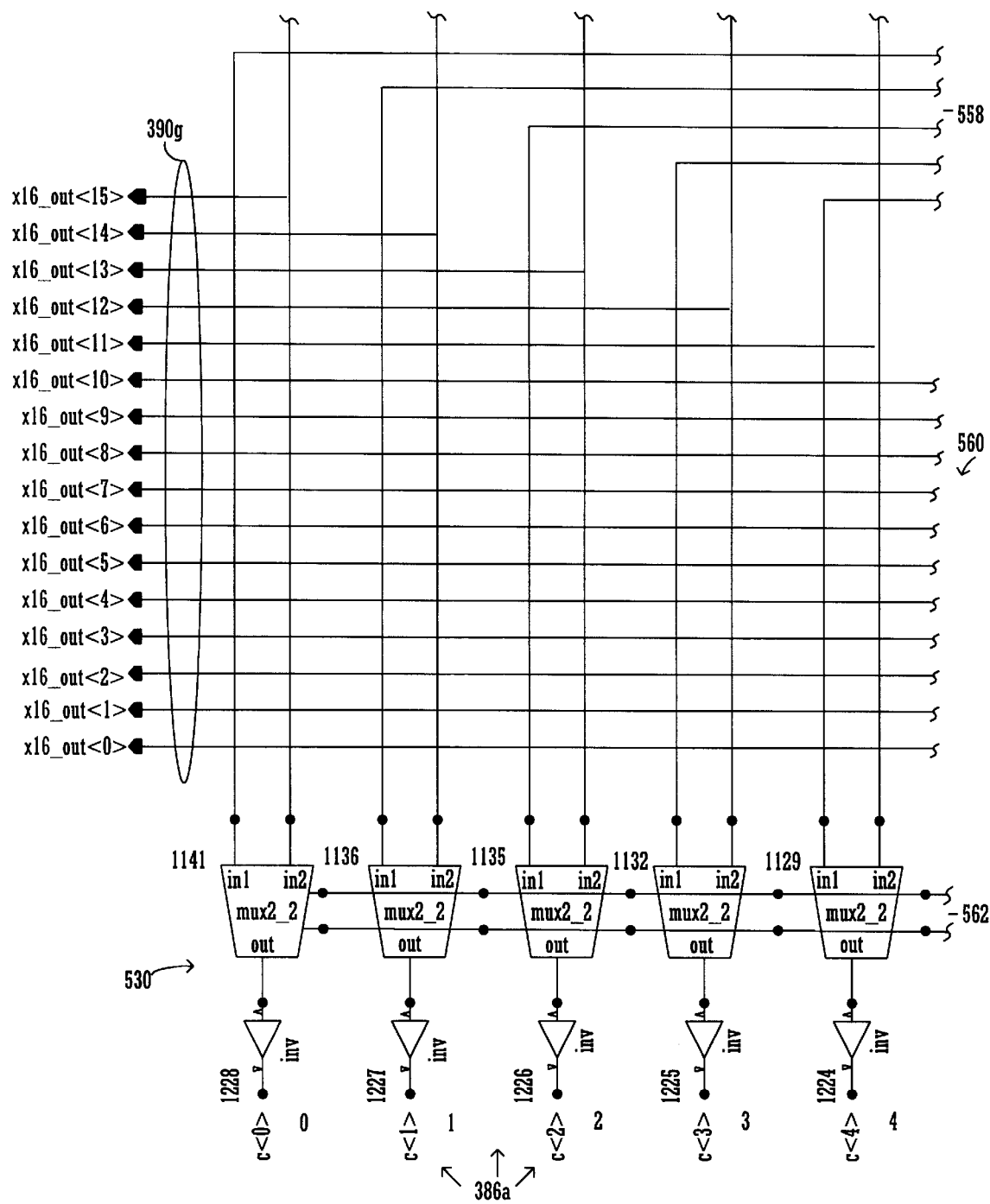
Figure 8B:
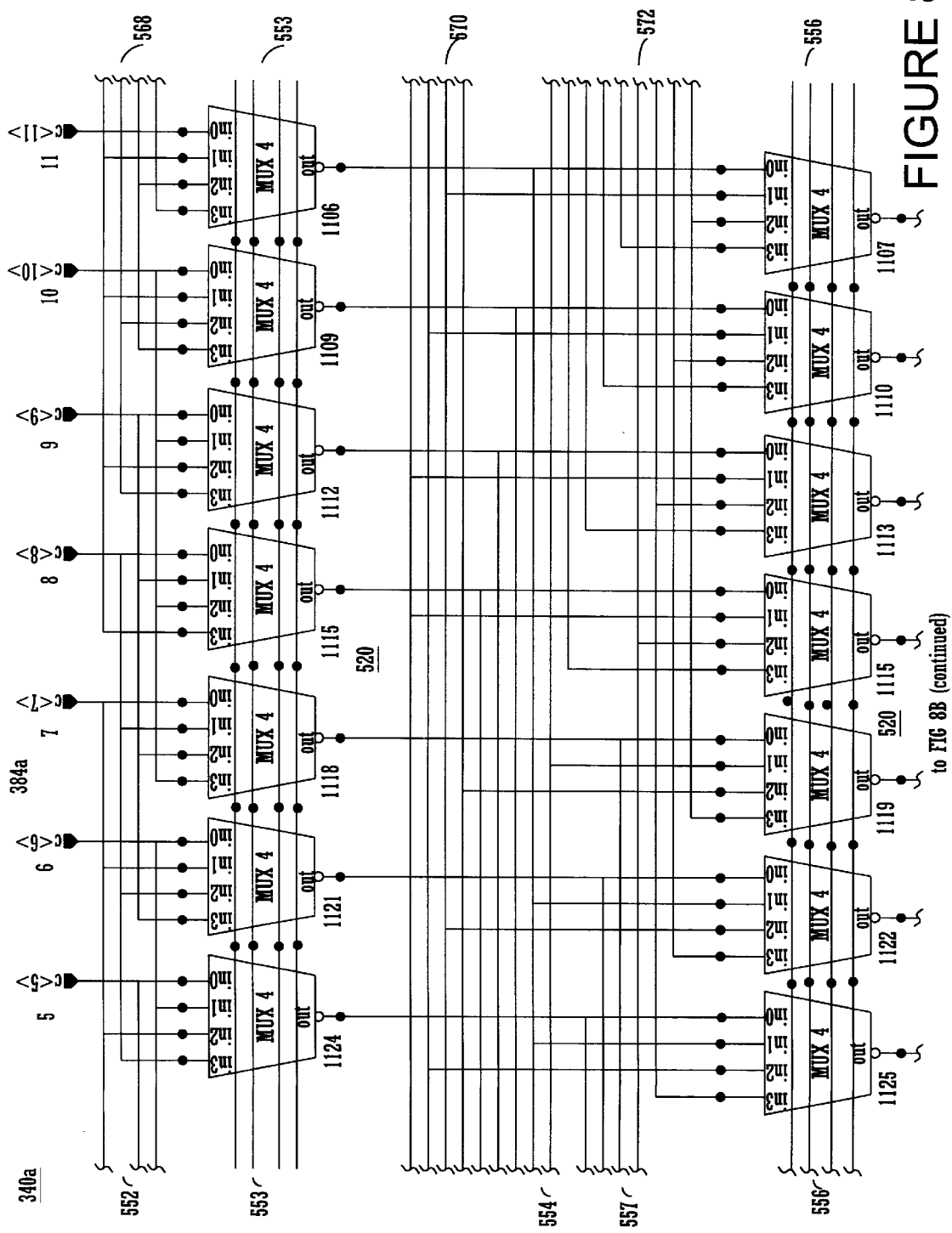
Figure 8B:
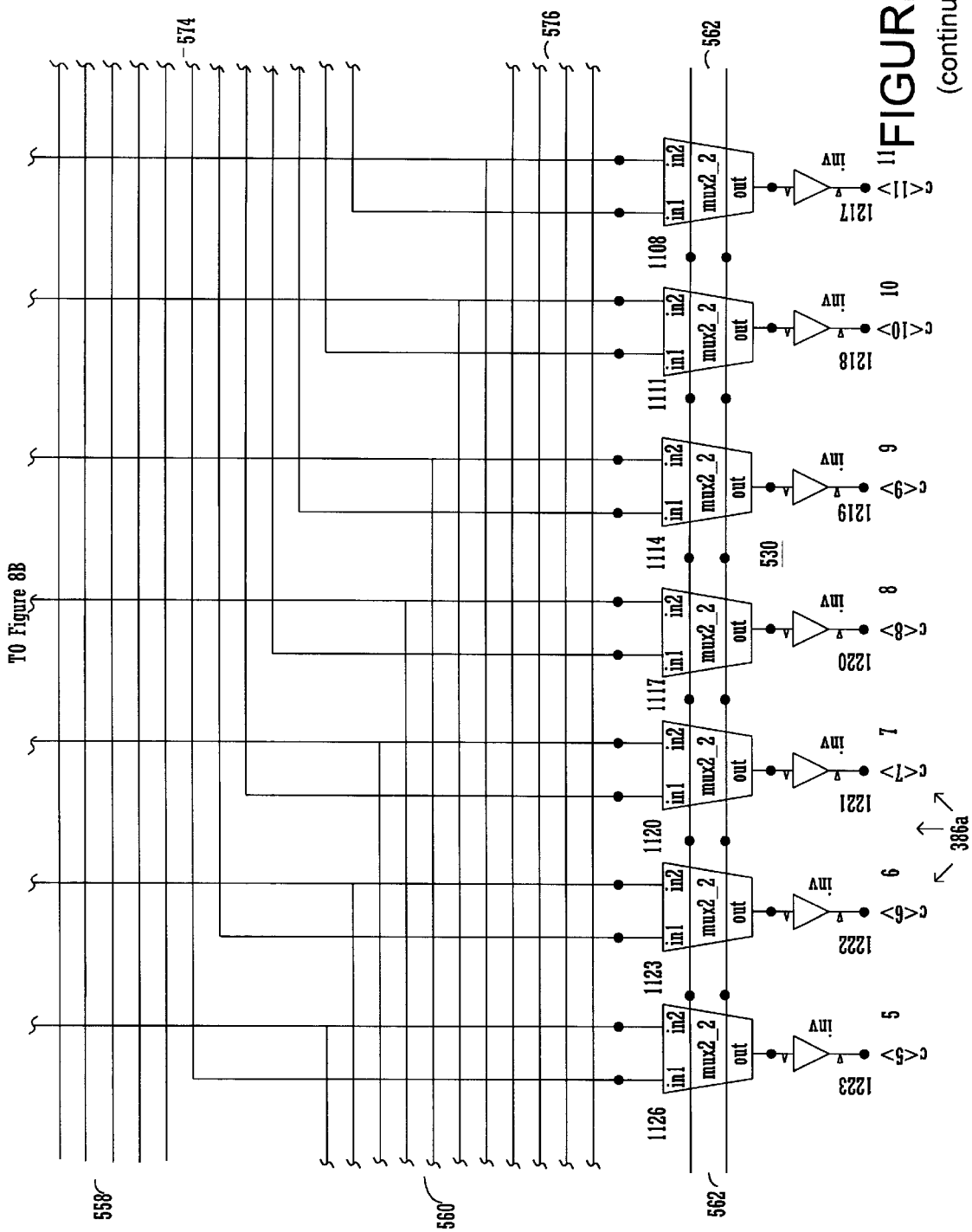
Figure 8C:
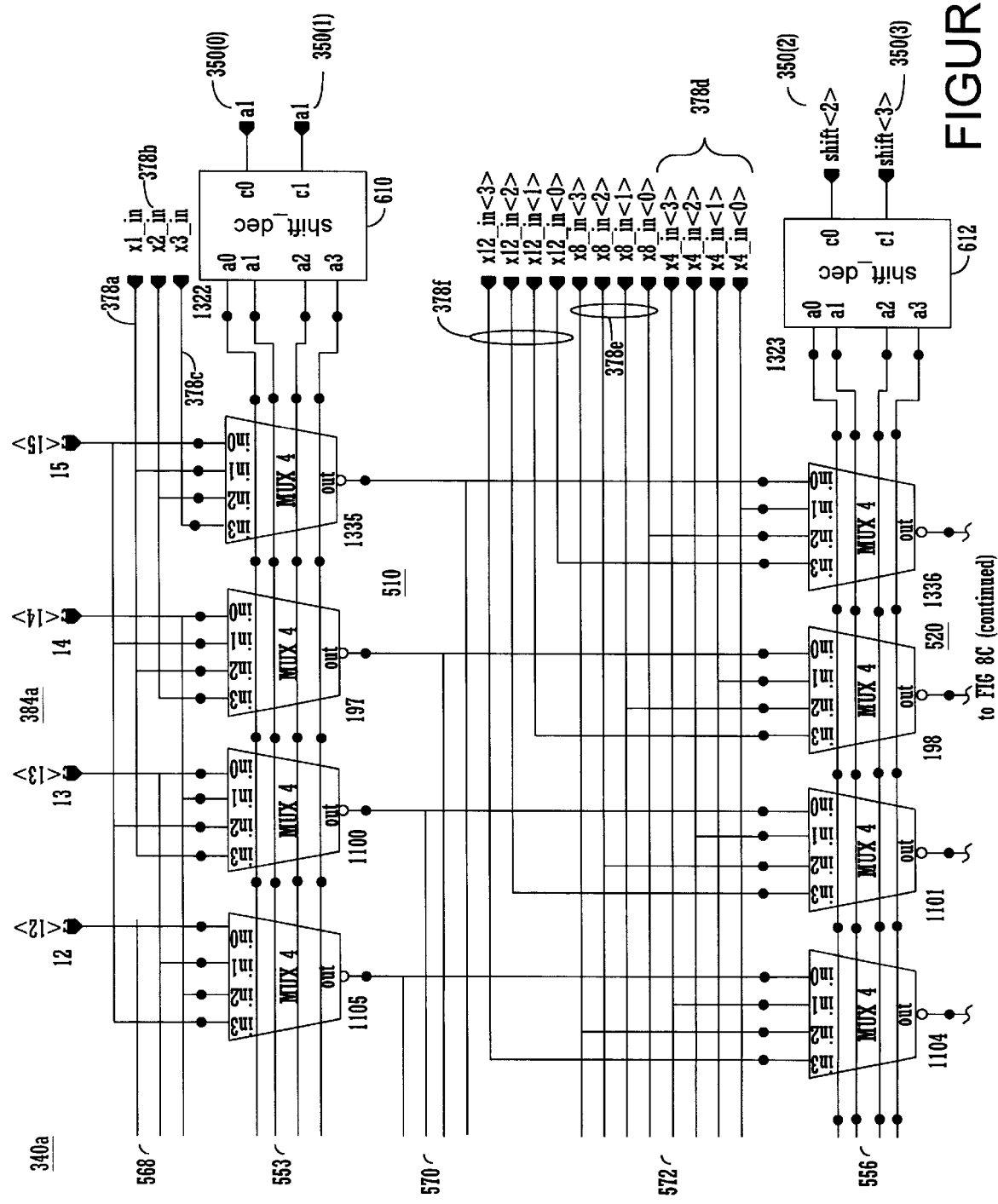
Figure 8C:
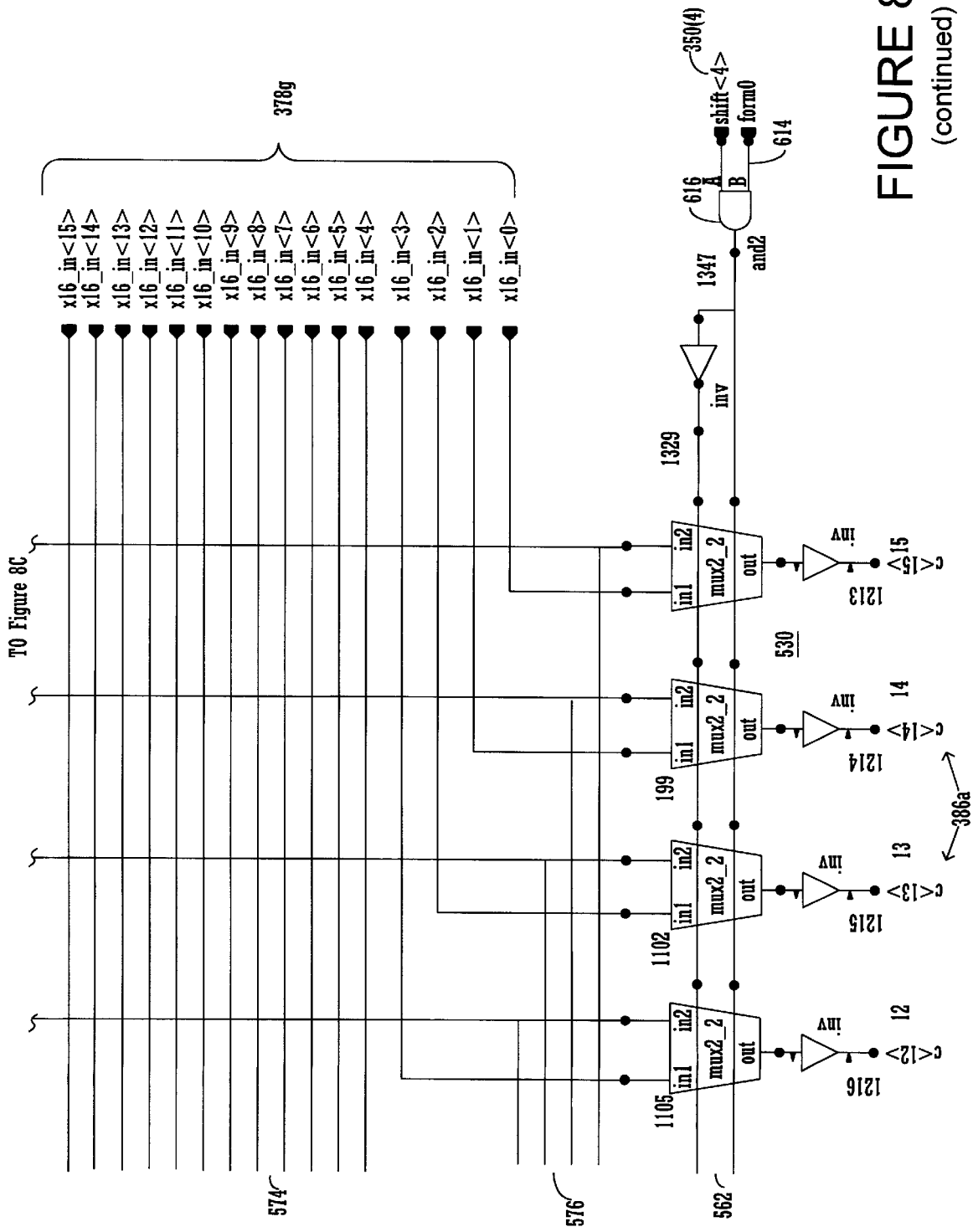

FIG. 8A, FIG. 8B and FIG. 8C together represent a schematic diagram of one implementation of the 16-bit shifter 340a in accordance with one embodiment of the present invention. It is appreciated that shifter 340b is constructed using an analogous design. Shifter 340a contains three levels of cascaded multiplexers which perform the shifting operations. The cascaded levels are programmable to implement the shifting operation as indicated by the shift amount vector 350. Each level can provide a select one of a predetermined range of numeric shift amounts with the total shift amount being the sum of each selected amount from all the multiplexer levels.

The first cascaded multiplexer level 510 consists of 16 multiplexers which each receive a respective bit of bits a0 . . . a15 from bus 384a at their IN0 inputs. Their other shift inputs, IN1, IN2 and IN3, receive signals from inputs 378a, 378b and 378c (FIG. 8C) which originate from the partition control logic 345'. With respect to the first level multiplexers 510, lines 568 couple the circuitry of FIG. 8C to FIG. 8B and lines 552 couple the circuitry of FIG. 8B to FIG. 8A. Select control lines 553 are coupled, in parallel, to the select inputs of each multiplexer of level 510 and are generated by decoder 610 of FIG. 8C. Decoder 610 receives shift amount bits shift0 and shift1 represented as lines 350(0) and 350(1), respectively. The first level multiplexers 510 can shift by 0, 1, 2, or 3 bits. The inputs to the first level multiplexers 510 provide outputs 390a–390c as shown in FIG. 8A and receive inputs 378a–378c as shown in FIG. 8C.

The second cascaded multiplexer level 520 consists of 16 multiplexers which each receive a respective bit of the 16 outputs of the first multiplexer level 510 at their IN0 inputs. Their other shift inputs, IN1, IN2 and IN3, receive signals from inputs 378f, 378d and 378e (as shown in FIG. 8C) which originate from the partition control logic 345'. With respect to the second level multiplexers 520, lines 570 and 572 couple the circuitry of FIG. 8C to FIG. 8B and lines 557 and 554 couple the circuitry of FIG. 8B to FIG. 8A. Select control lines 556 are coupled, in parallel, to the select inputs of each multiplexer of level 520 and are generated by decoder 612 of FIG. 8C. Decoder 612 receives shift amount bits shift2 and shift3 represented as lines 350(2) and 350(3), respectively. The second level multiplexers 520 can shift by 0, 4, 5, or 6 bits. The inputs to the second level multiplexers 520 provide outputs 390d–390f (each 4-bits wide) as shown in FIG. 8A and receive inputs 378d–378f as shown in FIG. 8C.

The third cascaded multiplexer level 530 consists of 16 multiplexers which each receive a respective bit of the 16 outputs of the second multiplexer level 520 at their IN0 inputs. Their other shift inputs, IN1, IN2 and IN3, receive signals from inputs 378g (as shown in FIG. 8C) which originate from the partition control logic 345'. The third cascaded multiplexer level 530 generates bits 0–15 of the output vector 386a. With respect to the third level multiplexers 530, lines 574 and 576 couple the circuitry of FIG. 8C to FIG. 8B and lines 558 and 560 couple the circuitry of FIG. 8B to FIG. 8A. Select control lines 552 are coupled, in parallel, to the select inputs of each multiplexer of level 530 and are generated by AND gate 616 of FIG. 8C. And gate 616 receives the MSB shift amount bit shift4 from line 350(4) and fo signal of line 614. The third level multiplexers 530 can shift by 0 or 7 bits. The inputs to the third level multiplexers 530 provide outputs 390g (8-bits wide) as shown in FIG. 8A and receive inputs 378g (8-bits wide) as shown in FIG. 8C.

In operation, in order to provide a shift amount of a particular number, the selected shift amounts of each cascaded multiplexer level are added together to arrive at the particular number. For instance, to shift by 10 bits to the right, the first level 510 can be selected to shift by three, the second level 520 can be selected to shift by zero and the third level 530 can be selected to shift by 7, e.g., 10=3+0+7. Using the predetermined shift range of each multiplexer level, any shift amount from 1–15 bits can be performed by shifter 340a. The inputs 378a–378g control the partitioning and sign aspects of the shifting operations.

Figure 9A:
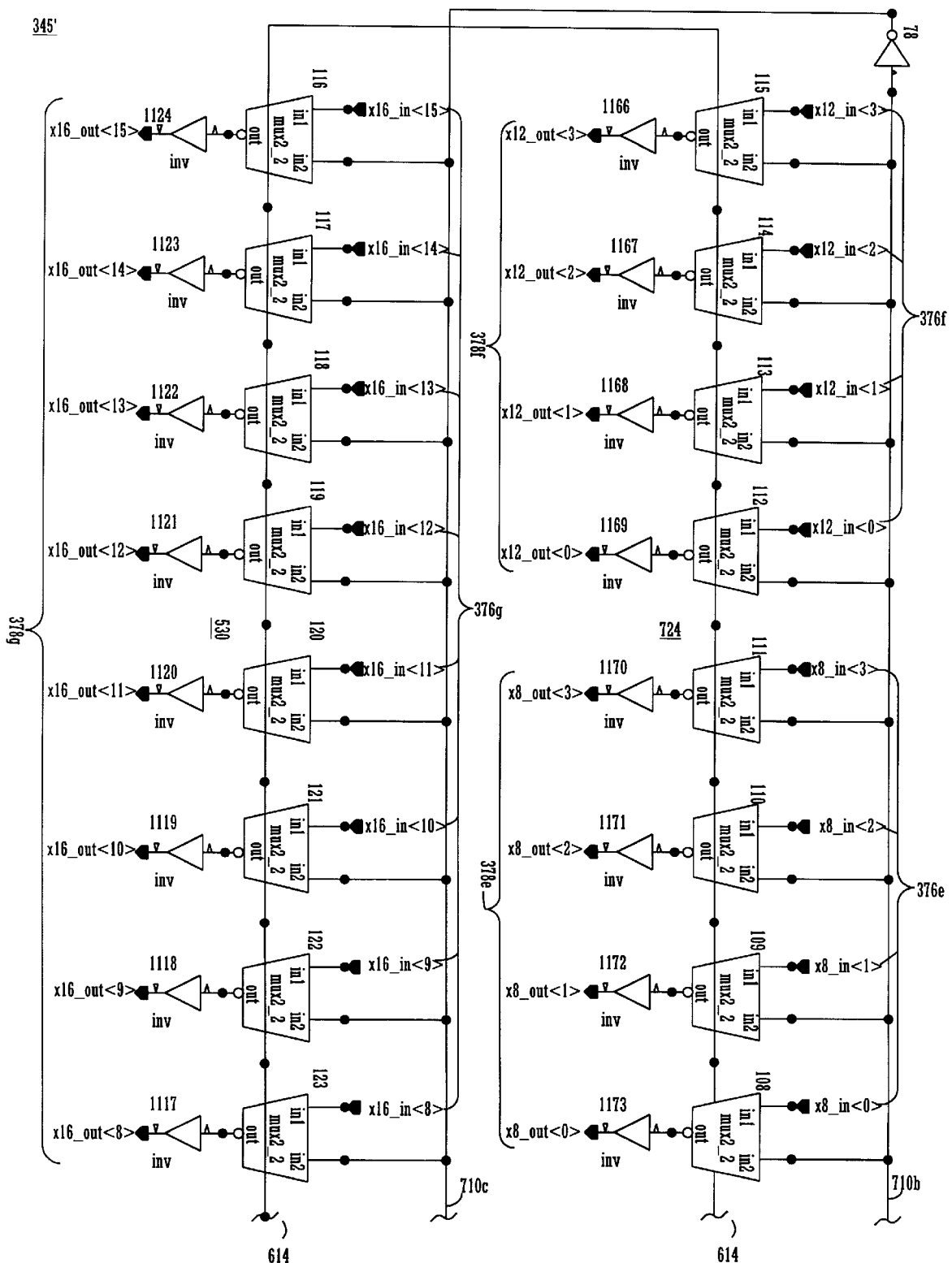
FIG. 9A and FIG. 9B represent a schematic diagram of the partition control logic associated with the partitioned shift right logic circuits in accordance with one embodiment of the present invention.
Figure 9B:
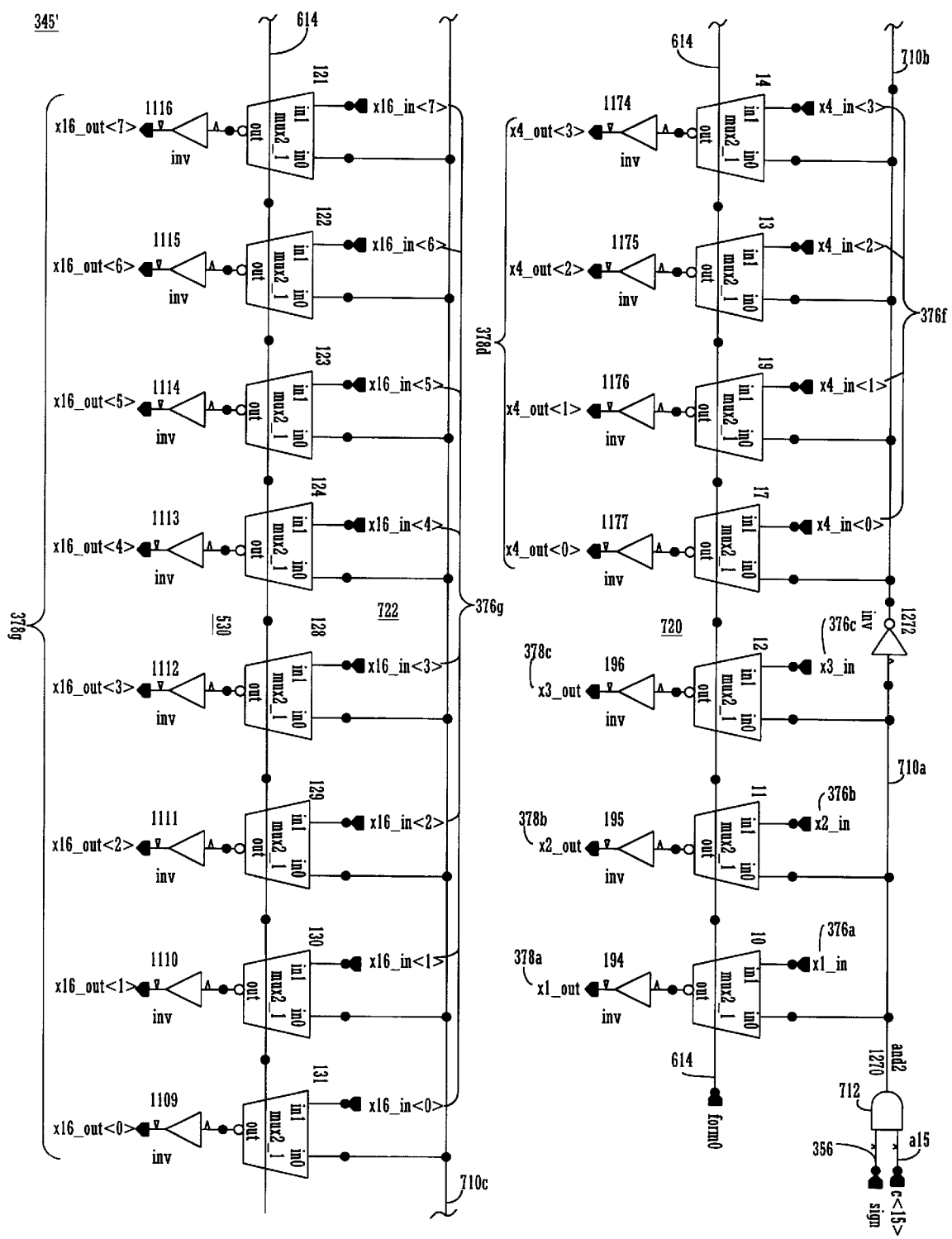

FIG. 9A and FIG. 9B illustrate a schematic diagram of the partitioning control circuit 345' which receives signals 376a–376g and generates signals 378a–378g as shown in FIG. 7. As shown in FIG. 9B, AND gate 712 of circuit 345' receives the sign bit 356 and also the MSB bit, a15, of bus 384a and generates a signal over line 710a which is coupled to the IN0 input of the bottom three multiplexers of group 720. The IN1 inputs of these multiplexers receive inputs 376a–376c, respectively, and these multiplexers generate outputs 378a–378c as shown in FIG. 9B. Signal 710a is inverted and supplied over line 710b to the IN0 inputs of the top four multiplexers of group 720. The IN1 inputs of these multiplexers receive bits 0–3 of input 376d, respectively, and these multiplexers generate bits 0–3 of outputs 378d as shown in FIG. 9B. It is appreciated that the f0 signal over line 614 controls the selection of all multiplexers of group 720.

Refer to FIG. 9A. Line 710b is supplied to the IN0 inputs of the bottom four multiplexers of group 724. The IN1 inputs of these multiplexers receive bits 0–3 of input 376e, respectively, and these multiplexers generate bits 0–3 of outputs 378e. Line 710b is also supplied to the IN0 inputs of the top four multiplexers of group 724. The IN1 inputs of these multiplexers receive bits 0–3 of input 376f, respectively, and these multiplexers generate bits 0–3 of outputs 378f. Line 710b is inverted and supplied over line 710c. Line 710c is supplied to the IN0 inputs of the eight multiplexers of group 726. The IN1 inputs of these multiplexers receive bits 8–15 of input 376g, respectively, and these multiplexers generate bits 8–15 of outputs 378g. It is appreciated that the f0 signal over line 614 controls the selection of all multiplexers of groups 724 and 726.

Refer to FIG. 9B. Line 710c is supplied to the IN0 inputs of the eight multiplexers of group 722. The IN1 inputs of these multiplexers receive bits 0–7 of input 376g, respectively, and these multiplexers generate bits 0–7 of outputs 378g. It is appreciated that the f0 signal over line 614 controls the selection of all multiplexers of groups 722.

Computer System.

Figure 10:
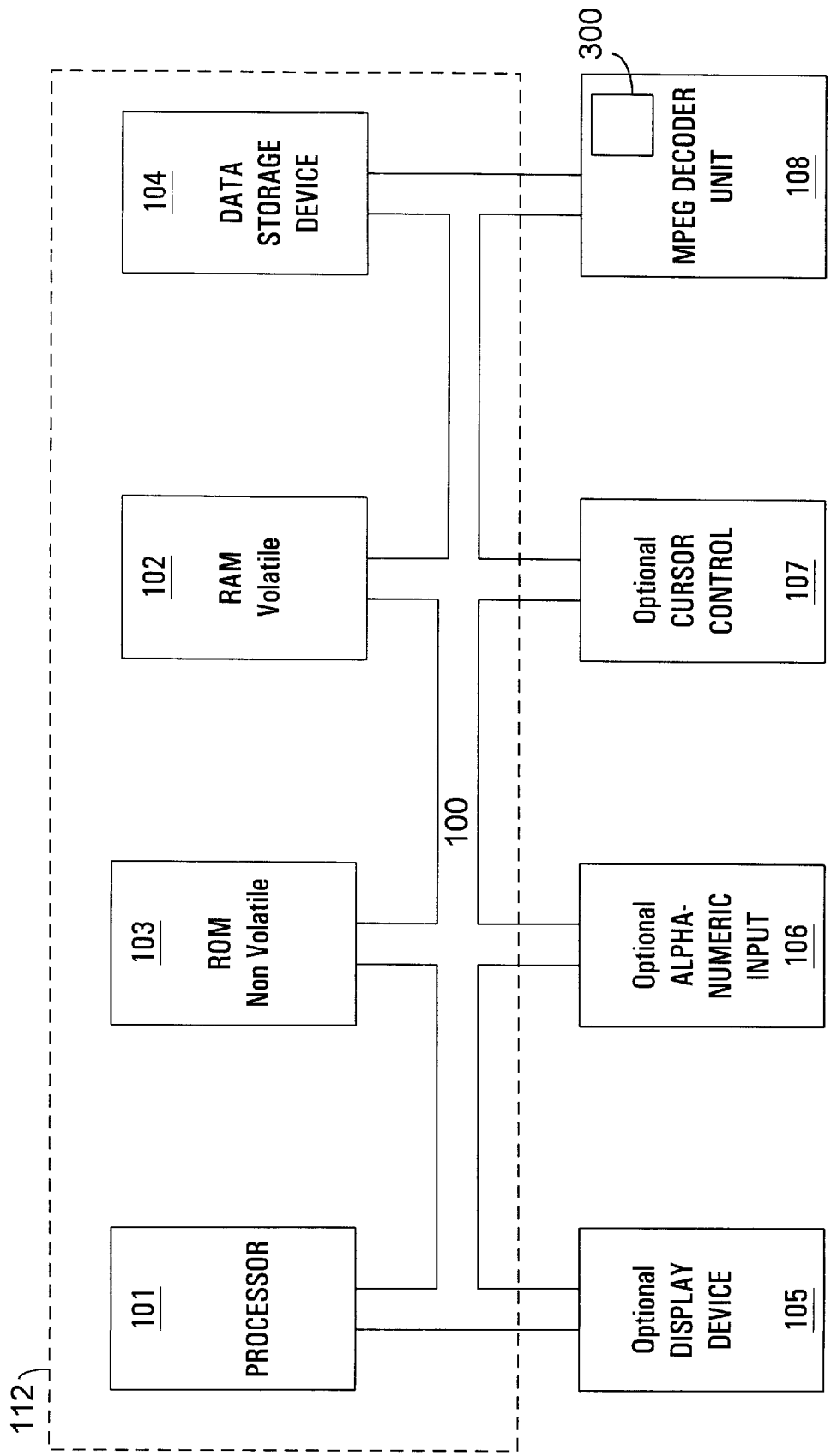
FIG. 10 is a block diagram of a general purpose computer system having an MPEG (Motion Picture Expert Group) decoder circuit containing the partitioned right shift logic circuit with rounding support (SRR circuit) in accordance with the present invention.

As shown in FIG. 10, the SRR circuit 300 of the present invention can be implemented within a signal decoder unit 108 of a host computer system 112. In one embodiment of the present invention, the decoder unit 108 can be an MPEG decoder unit.

In host computer system 112 of FIG. 10 includes an address/data bus 100 for communicating information, a central processor 101 coupled with the bus for processing information and instructions, a volatile memory 102 (e.g., random access memory RAM) coupled with the bus 100 for storing information and instructions for the central processor 101 and a non-volatile memory 103 (e.g., read only memory ROM) coupled with the bus 100 for storing static information and instructions for the processor 101. Computer system 112 also includes a data storage device 104 ("disk subsystem") such as a magnetic or optical disk and disk drive coupled with the bus 100 for storing information and instructions and a display device 105 coupled to the bus 100 for displaying information to the computer user. System 112 can also be referred to as an embedded system.

Also included in computer system 112 of FIG. 10 is an optional alphanumeric input device 106 including alphanumeric and function keys coupled to the bus 100 for communicating information and command selections to the central processor 101. System 112 also includes an optional a cursor control or directing device 107 coupled to the bus for communicating user input information and command selections to the central processor 101. The cursor directing device 107 can be implemented using a number of well known devices such as a mouse, a track ball, a track pad, an electronic pad and stylus, an optical tracking device, a touch screen etc. MPEG decoder unit 108 is coupled to the bus 100 and is for decoding multi-media content for rendering on device 105. The display device 105 utilized with the computer system 112 is optional and may be a liquid crystal device, cathode ray tube (CRT), field emission device (FED, also called flat panel CRT) or other display device suitable for creating graphic images and alphanumeric characters recognizable to the user.

SRR Circuit Example.

The following example illustrates the shift right operation with rounding for shifting −3 decimal (1111 1111 1111 1101) by three (00011) bit positions. First, the 16-shift amount vector using the 4×16 decoder 310a generates the following decoded result at output 380a:

0000 0000 0000 0100

Next, the above decoded result is used to control the output of the modular rounding control unit 320a, when generates the following mask at output 382a:

0000 0000 0000 0100

Next, the above mask or "rounding coefficient," is added to the input binary value as:

```
   1111 1111 1111 1101
   0000 0000 0000 0100
+ ---------------------
   0000 0000 0000 0000   ( output at 384a)
```

Next, the sum is shifted right by three bit positions to yield the below vector at output 386a:

0000 0000 0000 0000.

The preferred embodiment of the present invention, a partitioned shift right logic circuit that is programmable and contains rounding support, is thus described. While the present invention has been described in particular embodiments, it should be appreciated that the present invention should not be construed as limited by such embodiments, but rather construed according to the below claims.

What is claimed is:

1. A circuit comprising:

a decoder receiving a shift value, indicating a number of bits to right shift an input binary value, and producing a decoded result indicating a guard bit position;

a plurality of rounding control circuits together producing a multi-bit mask, each circuit receiving a respective bit of said decoded result and also receiving a respective predetermined number of bits of said input binary value, each of said rounding control circuits separately computing a respective sticky bit corresponding to its bit position and also computing a mask bit based on said respective sticky bit, a sign bit and said respective bit of said decoded result;

an adder circuit adding said multi-bit mask to said input binary value to produce a sum value; and a right shift circuit producing a binary shifted result by right shifting said sum value a number of bits corresponding to said shift value.

2. A circuit as described in claim 1 wherein said right shift circuit comprises a plurality of cascaded multiplexer stages wherein each multiplexer stage is programmable to select a right shift amount from a predetermined range of values.

3. A circuit as described in claim 1 wherein said right shift circuit is ble to right shift signed binary values.

4. A circuit as described in claim 1 wherein said adder circuit is partitioned, able to selectively produce a single 32-bit sum value and also able to selectively produce two 16-bit sum values and wherein said right shift circuit is also partitioned, able to selectively shift said single 32-bit sum value and also able to selectively separately shift said two 16-bit sum values.

5. A circuit as described in claim 4 wherein said plurality of rounding control circuits are also partitioned, able to selectively produce a single 32-bit mask and also able to selectively produce two separate 16-bit masks.

6. A circuit as described in claim 5 wherein said decoder is also partitioned, able to selectively produce a single 32-bit decoded result and able to selectively produce two separate 16-bit decoded results.

7. A circuit as described in claim 1 wherein, for an ith rounding control circuit, said predetermined number of bits of said input binary value are the (i-1)th, (i-2)th, (i-3)th and (i-4)th bits of said input binary value and wherein said ith rounding control circuit comprises:

OR logic producing a logical OR result of said (i-1)th, (i-2)th, (i-3)th and (i-4)th bits;

output circuitry producing logical one in said mask provided said sign bit indicates a non-signed input binary value and its respective bit of said decoded result is a logical one; and wherein said output circuitry also produces a logical one in said mask provided said sign bit indicates a signed input binary value, said OR result is a logical one and its respective bit of said decoded result is a logical one.

8. A circuit comprising:

a decoder means for receiving a multi-bit shift value indicating a number of bits to right shift an input binary value and for decoding said multi-bit shift value to produce a decoded result indicating a guard bit position;

a plurality of rounding control units together producing a multi-bit mask, each unit containing means for receiving a respective bit of said decoded result and for receiving a respective predetermined number of bits of said input binary value, each of said rounding control units separately for computing a respective sticky bit corresponding to its bit position and also for computing a mask bit based on said respective sticky bit, a sign bit and said respective bit of said decoded result;

an adder means for adding said mask value to said input binary value to produce a sum value; and a right shift means for producing a binary shifted result by right shifting said sum value a number of bits corresponding to said multi-bit shift value.

9. A circuit as described in claim 8 wherein said right shift means comprises a plurality of cascaded multiplexer stages wherein each multiplexer stage is programmable for selecting a right shift value from a predetermined range.

10. A circuit as described in claim 8 wherein said right shift means is able to right shift signed binary values.

11. A circuit as described in claim 8 wherein said adder means is partitioned, able to selectively produce a single 32-bit sum value and able to selectively produce two 16-bit sum values and wherein said right shift circuit is also partitioned, able to selectively shift said single 32-bit sum value and also able to selectively separately shift said two 16-bit sum values.

12. A circuit as described in claim 11 wherein said plurality of rounding control units are also partitioned, able to selectively produce a single 32-bit mask and able to selectively produce two separate 16-bit masks.

13. A circuit as described in claim 12 wherein said decoder means is also partitioned, able to selectively produce a single 32-bit decoded result and able to selectively produce two separate 16-bit decoded results.

14. A circuit as described in claim 8 wherein, for an ith rounding control unit, said predetermined number of bits of said input binary value are the (i-1)th, (i-2)th, (i-3)th and (i-4)th bits of said input binary value and wherein said ith rounding control unit of said plurality of rounding control units comprises:

OR means for producing a logical OR result of said (i-1)th, (i-2)th, (i-3)th and (i-4)th bits;

output circuit means for producing logical one in said mask provided said sign bit indicates a non-signed input binary value and its respective bit of said decoded result is a logical one; and wherein said output circuit means is also for producing a logical one in said mask provided said sign bit indicates a signed input binary value, said OR result is a logical one and its respective bit of said decoded result is a logical one.

15. A computer system comprising:

a processor coupled to a bus;

a memory unit coupled to said bus; and an MPEG decoder coupled to said bus and having a right shift and rounding circuit comprising:

a decoder receiving a shift value, indicating a number of bits to right shift an input binary value, and producing a decoded result indicating a guard bit position;

a plurality of rounding control circuits together producing a multi- bit mask, each circuit receiving a respective bit of said decoded result and also receiving a respective predetermined number of bits of said input binary value, each of said rounding control circuits separately computing a respective sticky bit corresponding to its bit position and also computing a mask bit based on said respective sticky bit, a sign bit and said respective bit of said decoded result;

an adder circuit adding said multi-bit mask to said input binary value to produce a sum value; and a right shift circuit producing a binary shifted result by right shifting said sum value a number of bits corresponding to said shift value.

16. A computer system as described in claim 15 wherein said right shift circuit comprises a plurality of cascaded multiplexer stages wherein each multiplexer stage is programmable to select a right shift amount from a predetermined range of values and wherein said right shift circuit is able to right shift signed binary values.

17. A computer system as described in claim 15 wherein said adder circuit is partitioned, able to selectively produce a single 32-bit sum value and also able to selectively produce two 16-bit sum values and wherein said right shift circuit is also partitioned, able to selectively shift said single 32-bit sum value and also able to selectively separately shift said two 16-bit sum values.

18. A computer system as described in claim 17 wherein said plurality of rounding control circuits are also partitioned, able to selectively produce a single 32-bit mask and also able to selectively produce two separate 16-bit masks.

19. A computer system as described in claim 18 wherein said decoder is also partitioned, able to selectively produce a single 32-bit decoded result and able to selectively produce two separate 16-bit decoded results.

20. A computer system as described in claim 15 wherein, for an ith rounding control circuit, said predetermined number of bits of said input binary value are the (i-1)th, (i-2)th, (i-3)th and (i-4)th bits of said input binary value and wherein said ith rounding control circuit comprises:

OR logic producing a logical OR result of said (i-1)th, (i-2)th, (i-3)th and (i-4)th bits;

output circuitry producing logical one in said mask provided said sign bit indicates a non-signed input binary value and its respective bit of said decoded result is a logical one; and wherein said output circuitry also produces a logical one in said mask provided said sign bit indicates a signed input binary value, said OR result is a logical one and its respective bit of said decoded result is a logical one.

\* \* \* \* \*